United States Patent
Wagner et al.

(10) Patent No.: US 9,520,059 B2
(45) Date of Patent: Dec. 13, 2016

(54) METHOD FOR A DETERMINISTIC SELECTION OF A SENSOR FROM A PLURALITY OF SENSORS

(71) Applicant: Micronas GmbH, Freiburg (DE)

(72) Inventors: Eckart Wagner, Voerstetten (DE); Thilo Rubehn, Gundelfingen (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 15/052,311

(22) Filed: Feb. 24, 2016

(65) Prior Publication Data

US 2016/0247391 A1    Aug. 25, 2016

(30) Foreign Application Priority Data

Feb. 24, 2015  (DE) .................. 10 2015 002 170

(51) Int. Cl.
*G08C 19/16*   (2006.01)

(52) U.S. Cl.
CPC .................... *G08C 19/16* (2013.01)

(58) Field of Classification Search
CPC . G08C 17/02; G08C 2201/20; G08C 2201/32; G08C 15/12; G08C 19/22; G08C 2201/92; G08C 17/00; G08C 19/16; G08C 19/18
USPC ........................................ 340/12.1
See application file for complete search history.

(56) References Cited

U.S. PATENT DOCUMENTS

| 8,183,982 B2 * | 5/2012 | Scherr ................. H04L 5/1484 340/10.1 |
| 8,519,819 B2 | 8/2013 | Scherr |
| 8,577,634 B2 * | 11/2013 | Donovan ........... G05B 19/0423 702/79 |
| 2012/0195389 A1 * | 8/2012 | Scherr ................. H04L 5/1484 375/259 |

OTHER PUBLICATIONS

Josef Kramolis, Freescale Semiconductor, "SENT/SPC Driver for the MPC5510 Microcontroller Family," Application Note AN4219, Rev. 0, pp. 1-27 (Oct. 2010).
Infineon, "TLE4998C3, TLE4998C4 Programmable Linear Hall Sensor," Data Sheet, Rev. 1.0, pp. 1-44 (Dec. 2008).

* cited by examiner

*Primary Examiner* — Mark Blouin
(74) *Attorney, Agent, or Firm* — Muncy, Geissler, Olds & Lowe, P.C.

(57) ABSTRACT

Method for a deterministic selection of a sensor from a plurality of sensors, having a control unit and multiple sensors connected to the control unit by means of a three-wire bus, wherein the sensors are connected parallel to one another at a three-wire bus by at least two lines and a protocol frame according to SENT specification is used between the control unit and the sensors for a data exchange, and within the protocol frame a specified sensor is selected from a plurality of sensors by means of a selection signal sent by the control unit, wherein each sensor is associated with an unambiguous number of pulses for the selection of the sensor, and the selection of the sensor is performed by means of the selection signal having a predetermined number of pulses occurring immediately in succession.

9 Claims, 1 Drawing Sheet

METHOD FOR A DETERMINISTIC SELECTION OF A SENSOR FROM A PLURALITY OF SENSORS

This nonprovisional application claims priority under 35 U.S.C. §119(a) to German Patent Application No. 10 2015 002 170.2, which was filed in Germany on Feb. 24, 2015, and which is herein incorporated by reference.

BACKGROUND OF THE INVENTION

Field of the Invention

The invention relates to a method for a deterministic selection of a sensor from a plurality of sensors.

Description of the Background Art

A method for a deterministic selection of a sensor from a plurality of sensors is known from U.S. Pat. No. 8,519,819 B2. To this end, multiple sensors are connected parallel to one another at a three-wire bus and connected to a control unit. The control unit communicates in accordance with a so-called SENT "Single Edge Nibble Transmission" protocol with the sensors. In order to exchange data with a single sensor, initially a deterministic selection of the sensors is performed by means of the control unit. To this end, the length of time of a pulse is varied by the control unit, i.e. the duration between a falling edge and an edge rising immediately thereafter. In accordance with the method specified here, as well as in general, the rate of rise of the rising edge is only poorly defined in SENT due to the external resistance and conduction capacity used. This can lead to misinterpretations of the duration between the falling and the rising edge. Consequently, an incorrect sensor could be selected.

Further known from U.S. Pat. No. 8,183,982 B2 and U.S. Pat. No. 8,577,634 B2 are sensors connected to a control unit with the use of a three-wire bus.

SUMMARY OF THE INVENTION

It is therefore an object of the invention to provide a method which further develops the prior art.

According to an embodiment of the invention, a method for a deterministic selection of a sensor from a plurality of sensors is provided, having a control unit and multiple sensors connected to the control unit by means of a three-wire bus, wherein the sensors are connected parallel to one another by at least two lines of the three-wire bus, and between the control unit and the sensors, a protocol frame according to SENT specifications is used for a data exchange, and within the protocol frame a specified sensor is selected from a plurality of sensors by means of selection signal sent by the control unit, wherein each sensor is associated with an unambiguous number of pulses for the selection of the sensor, and the selection of a sensor is performed by means of the selection signal having a predetermined number of pulses occurring immediately in succession.

The sensors can be ICs having an integrated sensor, wherein the sensors can be designed as Hall sensors. Furthermore, a level of a selection signal may assume a first value or a second value, wherein the first lower value can be configured as the "low" level and the second highest value as the "high" level. In addition, each pulse can be comprised of a first falling signal edge and a second rising signal edge occurring immediately in succession. A number of pulses can be greater than or equal to one.

An advantage of the device according to the invention is that with the method, a very reliable selection of a single sensor is achieved in a simple manner. Moreover, each of the sensors responds very quickly und thus allows for accelerated data transmission between the control unit and the sensors. In particular, the duration of a pulse is no longer relevant for the selection of a sensor. Hence, the above problem in many applications according to the SENT protocol and in particular, the one in patent U.S. Pat. No. 8,519,819 32, is solved.

In an embodiment, only a single, high signal level state can be formed between two successive pulses. In other words, after the first falling signal edge, the signal level rises from the first lower value to the second higher value to then again fall to the first lower value at the second falling signal edge.

In another embodiment, after the selection signal a pause signal is sent by the selected sensor or by the control unit. In an embodiment, the selection signal and the pause signal can be transmitted by the control unit as a part of a request signal.

In an embodiment, the time interval between two pulses can be at least a micro second, whereby it is advantageous when all pulses of the selection signal have the same predetermined duration. It is further advantageous when the duration between the falling edge and the rising edge of a pulse is selected to be between one micro second and eight micro seconds.

In an embodiment, each sensor can be controlled by a dedicated supply voltage line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
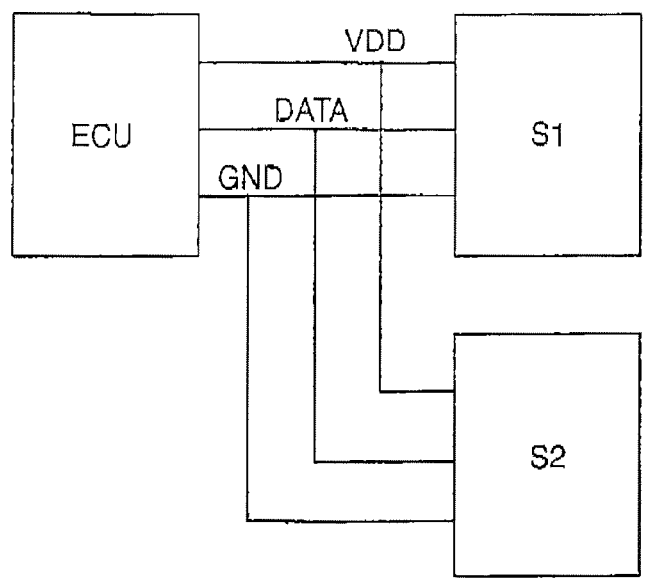
FIG. 1 illustrates a view of a first circuit configuration for implementing the method according to an embodiment of the invention.

The illustration of FIG. 1 shows a view of a first circuit configuration for implementing the method according to an exemplary embodiment of the invention. A control unit ECU is connected to a first sensor S1 and a second sensor S2 by means of a supply voltage line VDD and a data line DATA and a ground line GND. The abovementioned three lines VDD, DATA, GND form a three-wire bus. Both sensors S1 and S2 are connected to the bus parallel with one another.

Figure 2:
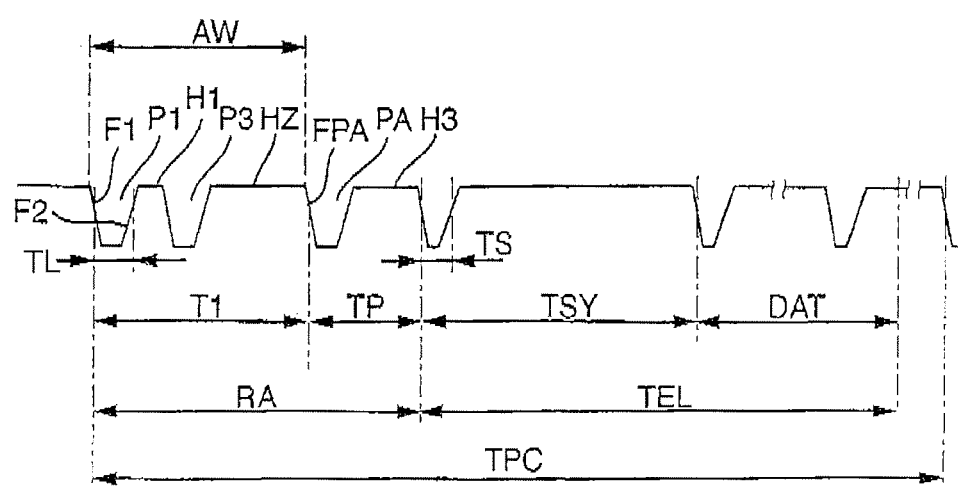
FIG. 2 illustrates a view of a protocol frame.

The illustration in FIG. 2 shows a view of a protocol frame TPC. The protocol frame TPC is comprised of a first part RA and a second part TEL. In the first part RA, by means of the control unit ECU a request signal is passed to the bus. In the second part TEL of the protocol frame TPC, the selected sensor S1 or S2 transmits a synchronization signal TSY and the sensor data within one section DAT to the control unit ECU. The first part RA comprises a selection signal AW with a duration T1 and a pause signal with a length TP. The selection signal AW comprises a first pulse P1 and a second pulse P2 with a first time H1 arranged between both pulses P1 and P2 with a high signal level and a second time H2 arranged after the second pulse P2 with a high signal level, wherein the first time H1 is substantially shorter than the second time H2. The pause signal comprises an initial pulse PA and a third time H3 with a high signal level, having a total time TP. The duration T1 of the selection signal AW is determined by the time between the falling signal level F1 of the first pulse P1 and the falling signal level FPA of the initial pulse PA.

By means of the number of pulses P1, P2, which is different for each of the connected sensors S1 and S2, either the sensor S1 is selected with a selection signal AW, which comprises only pulse P1—not shown, or the sensor S2 is selected by means of the two pulses P1 and P2, as shown in the illustration. It is understood that the sensors S1 and S2 were previously communicated a sensor-specific temporal pulse length TL.

By means of the control unit ECU, the pulse length TL of the pulses P1, P2 of the selection signal is set longer than the minimum duration of the pulses TS specified by the sensors, wherein each pulse P1, P2 always has a falling edge F1 and an edge F2 rising immediately thereafter.

What is claimed is:

1. A method for a deterministic selection of a sensor from a plurality of sensors, the method comprising:
    connecting a control unit and at least two sensors to the control unit via a three-wire bus, the sensors being connected parallel to one another by at least two lines of the three-wire bus;
    using, between the control unit and the at least two sensors, a protocol frame according to SENT specifications for a data exchange;
    selecting, within the protocol frame, a specific sensor from the at least sensors via a selection signal sent by the control unit; and
    associating, for the selection of the sensor, the at least two sensors are associated with an unambiguous number of pulses and the selection of a sensor is performed via the selection signal having a predetermined number of pulses occurring immediately in succession.

2. The method according to claim 1, wherein between two successive pulses only a single high signal level state is formed.

3. The method according to claim 1, wherein after the selection signal, a pause signal is sent by the control unit or the at least two sensors.

4. The method according to claim 3, wherein via the control unit, the selection signal and the pause signal are transmitted as part of a request signal.

5. The method according to claim 1, wherein the time interval between two pulses is at least one micro second.

6. The method according to claim 1, wherein all pulses of the selection signal have the same predetermined duration.

7. The method according to claim 1, wherein the duration between a falling edge and a rising edge of a pulse is selected to be between one micro second and eight micro seconds.

8. The method according to claim 1, wherein the number of pulses is greater than or equal to one.

9. The method according to claim 1, wherein each of the at least two sensors are controlled by a dedicated supply voltage line.

* * * * *